(12) United States Patent
Jin et al.

(10) Patent No.: US 8,943,070 B2
(45) Date of Patent: Jan. 27, 2015

(54) ADAPTIVE AND PERSONALIZED TAG RECOMMENDATION

(75) Inventors: Hongxia Jin, San Jose, CA (US); Qihua Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 12/838,427

(22) Filed: Jul. 16, 2010

(65) Prior Publication Data

US 2012/0016885 A1  Jan. 19, 2012

(51) Int. Cl.
*G06F 17/30* (2006.01)

(52) U.S. Cl.
CPC .............................. *G06F 17/30884* (2013.01)
USPC ............................ 707/748; 707/767; 707/770

(58) Field of Classification Search
CPC .................. G06F 17/30699; G06F 17/30029; G06F 17/3089; G06F 17/30997; G06F 17/30533; G06F 17/3053; G06F 17/30038; G06F 17/30864; G06F 17/30884
USPC .................................. 707/732, 767, 748, 770
See application file for complete search history.

(56) References Cited

U.S. PATENT DOCUMENTS

| | | | |
|---|---|---|---|
| 7,668,821 B1* | 2/2010 | Donsbach et al. | 707/765 |
| 7,805,431 B2* | 9/2010 | Siegel | 707/708 |
| 7,949,659 B2* | 5/2011 | Chakrabarti et al. | 707/732 |
| 2002/0198882 A1* | 12/2002 | Linden et al. | 707/10 |
| 2005/0270157 A1 | 12/2005 | Mohammed et al. | |
| 2006/0180647 A1 | 8/2006 | Hanson | |
| 2006/0218153 A1* | 9/2006 | Voon et al. | 707/10 |
| 2007/0078832 A1* | 4/2007 | Ott et al. | 707/3 |
| 2007/0174247 A1* | 7/2007 | Xu et al. | 707/3 |
| 2008/0040313 A1* | 2/2008 | Schachter | 707/2 |
| 2008/0091549 A1* | 4/2008 | Chang et al. | 705/26 |
| 2008/0114778 A1* | 5/2008 | Siegel | 707/100 |
| 2008/0201348 A1* | 8/2008 | Edmonds et al. | 707/101 |
| 2008/0215583 A1* | 9/2008 | Gunawardena et al. | 707/7 |
| 2009/0006373 A1* | 1/2009 | Chakrabarti et al. | 707/5 |
| 2009/0006374 A1* | 1/2009 | Kim et al. | 707/5 |
| 2009/0006398 A1* | 1/2009 | Lam et al. | 707/7 |
| 2009/0006442 A1* | 1/2009 | Anderson et al. | 707/102 |
| 2009/0083278 A1* | 3/2009 | Zhao et al. | 707/10 |
| 2009/0248687 A1* | 10/2009 | Su et al. | 707/6 |
| 2009/0276455 A1 | 11/2009 | Yu et al. | |
| 2009/0327336 A1* | 12/2009 | King et al. | 707/103 R |

(Continued)

OTHER PUBLICATIONS

Jschke et al., "Tag recommendations in Social Bookmarking systems,", AI Communications, v 21, n. 4, p. 231, 2008.

(Continued)

*Primary Examiner* — Thanh-Ha Dang
(74) *Attorney, Agent, or Firm* — Cantor Colburn LLP; Libby Toub

(57) ABSTRACT

Embodiments of the invention relate to techniques for personalized tag recommendation for enterprise social bookmarking systems. According to one embodiment of the invention, a method comprises computing at least one set of candidate tags for a document in accordance with at least one factor, and combining the at least one set of candidate tags from different factors into an overall recommendation list of candidate tags. At least one suggested tag from the overall recommendation list is returned as a result of the combination. At least one applied tag that is applied to the document by a user of a computer system is recorded, and the combination is adjusted based on the at least one applied tag.

23 Claims, 10 Drawing Sheets

(56) References Cited

U.S. PATENT DOCUMENTS

| | | | |
|---|---|---|---|
| 2010/0161619 A1* | 6/2010 | Lamere et al. | 707/749 |
| 2010/0191694 A1* | 7/2010 | Pan et al. | 706/52 |
| 2011/0029533 A1* | 2/2011 | Jayakody et al. | 707/738 |
| 2011/0196923 A1* | 8/2011 | Marcucci et al. | 709/204 |
| 2011/0302117 A1* | 12/2011 | Pinckney et al. | 706/12 |
| 2012/0109982 A1* | 5/2012 | Jayakody et al. | 707/752 |

OTHER PUBLICATIONS

Chojnacki, "Tag recommendations based on tracking social bookmarking systems," ECML PKDD 2009 Challenge.

Gemmell et al., "The impact of ambiguity and redundancy on tag recommendation in folksonomies," RecSys '09 Oct. 23-25, 2009 New York, NY.

Guan et al., "Personalized to recommendation using graph based ranking on multi-type interrelated objects," SIGIR '09, Jul. 19-23, 2009, Boston MA.

Xu et al., "Towards the semantic web: collaborative tag suggestions," WWW2006:Collaborative tagging workshop, Edinburgh, Scotland, 2006.

Chirita et al., "P-Tag: large scale automatic generation of personalized annotation tags for the web," WWW '07Proc, of $16^{th}$ Intl. Conf on WWW, pp. 845-854, NY, NY, 2007.

Farrell et al., "Fringe Contacts: People tagging for the enterprise," WWW 2006, Collaborative web tagging workshop, Edinburgh Scotland , 2006.

* cited by examiner

| Rec. # | Keyword | AP-TAG | w/o People-tagging | Non-adaptive |
|---|---|---|---|---|
| 2 | 0.1047 | 0.1435 | 0.1337 | 0.1338 |
| 4 | 0.1593 | 0.2040 | 0.1903 | 0.1950 |
| 6 | 0.1962 | 0.2443 | 0.2265 | 0.2381 |
| 8 | 0.2161 | 0.2689 | 0.2509 | 0.2611 |
| 10 | 0.2349 | 0.2862 | 0.2707 | 0.2810 |

(a) First 30 webpages of every user

FIG. 8A

| Rec. # | Keyword | AP-TAG | w/o People-tagging | Non-adaptive |
|---|---|---|---|---|
| 2 | 0.1113 | 0.1993 | 0.1951 | 0.1991 |
| 4 | 0.1623 | 0.2889 | 0.2818 | 0.2535 |
| 6 | 0.2009 | 0.3342 | 0.3278 | 0.2830 |
| 8 | 0.2242 | 0.3574 | 0.3514 | 0.3054 |
| 10 | 0.2418 | 0.3714 | 0.3666 | 0.3208 |

(b) All webpages of every user

FIG. 8B

| Webpages per user | Rec. 2 | Rec. 4 | Rec. 6 | Rec. 8 | Rec. 10 |
|---|---|---|---|---|---|
| 30 | 0.2265 | 0.3169 | 0.3666 | 0.3983 | 0.4199 |
| All | 0.2297 | 0.3431 | 0.4038 | 0.4372 | 0.4603 |

ADAPTIVE AND PERSONALIZED TAG RECOMMENDATION

BACKGROUND

The present invention relates to social bookmarking, and more specifically, to techniques for personalized tag recommendation for enterprise social bookmarking systems.

Social bookmarking has gained popularity among internet users. In most social bookmarking systems, users may annotate their bookmarked resources using text terms, which are usually referred to as tags. There are two major purposes for such tagging activities. First, tagging helps users to categorize their bookmarks and facilitate future retrieval of resources in different categories. Second, by making tags on one's bookmarks viewable by other users, tagging allows users to share useful resources they found with others, which is beneficial to the entire community.

Social bookmarking systems allow users to choose the terms they like to tag resources. Many social bookmarking systems also suggest tags to users based on the target resources. Tag recommendation can bring in a number of benefits. For example, tag recommendation makes tagging an easier task and thus encourages users to tag more often. By successfully predicting the tags a user would like to apply on a resource, tag recommendation may save users time on typing. Also, the suggested tags may remind users on the content of the corresponding resources so as to help them better annotate the resources. In addition, Tag recommendation may improve the quality of tags. By allowing users to click on a suggested tag instead of typing, tag recommendation may reduce the usage of simplified or incomplete terms in tags and reduce the occurrences of typos. Tag recommendation may also encourage the consistency of term selection in one's tags.

BRIEF SUMMARY

According to one embodiment of the present invention, a method comprises computing at least one set of candidate tags for a document in accordance with at least one factor, and combining the at least one set of candidate tags from different factors into an overall recommendation list of candidate tags. At least one suggested tag from the overall recommendation list is returned as a result of the combination. At least one applied tag that is applied to the document by a user of a computer system is recorded, and the combination is adjusted based on the at least one applied tag.

According to one embodiment of the present invention, a method, comprises computing at least one set of candidate tags for a document in accordance with at least one factor by extracting at least one keyword from the document, and associating an importance score with each keyword, wherein each keyword is a candidate tag. The at least one set of candidate tags from different factors are combined into an overall recommendation list of candidate tags, and at least one suggested tag from the overall recommendation list is returned as a result of the combination. At least one applied tag that is applied to the document by a user of a computer system is recorded, and the combination is adjusted based on the at least one applied tag.

According to another embodiment of the present invention, a system, comprises: means for computing at least one set of candidate tags for a document in accordance with at least one factor; means for combining the at least one set of candidate tags from different factors into an overall recommendation list of candidate tags; means for returning at least one suggested tag from the overall recommendation list as a result of the combination; means for recording at least one applied tag that is applied to the document by a user of a computer system; and means for adjusting the combination based on the at least one applied tag.

According to another embodiment of the present invention, a computer program product comprises a computer readable storage medium having computer readable program code embodied therewith, the computer readable program code comprising computer readable program code configured to compute at least one set of candidate tags for a document in accordance with at least one factor, and combine the at least one set of candidate tags from different factors into an overall recommendation list of candidate tags. At least one suggested tag from the overall recommendation list is returned as a result of the combination. At least one applied tag that is applied to the document by a user of a computer system is recorded and the combination is adjusted based on the at least one applied tag.

BRIEF DESCRIPTION OF THE SEVERAL VIEWS OF THE DRAWINGS

FIGS. 8(a) and 8(b) show experimental results on recalls of tag recommendation approaches in accordance with an embodiment of the invention;

FIG. 9 shows experimental results on recalls with approximate matching in accordance with an embodiment of the invention.

DETAILED DESCRIPTION

Figure 1:
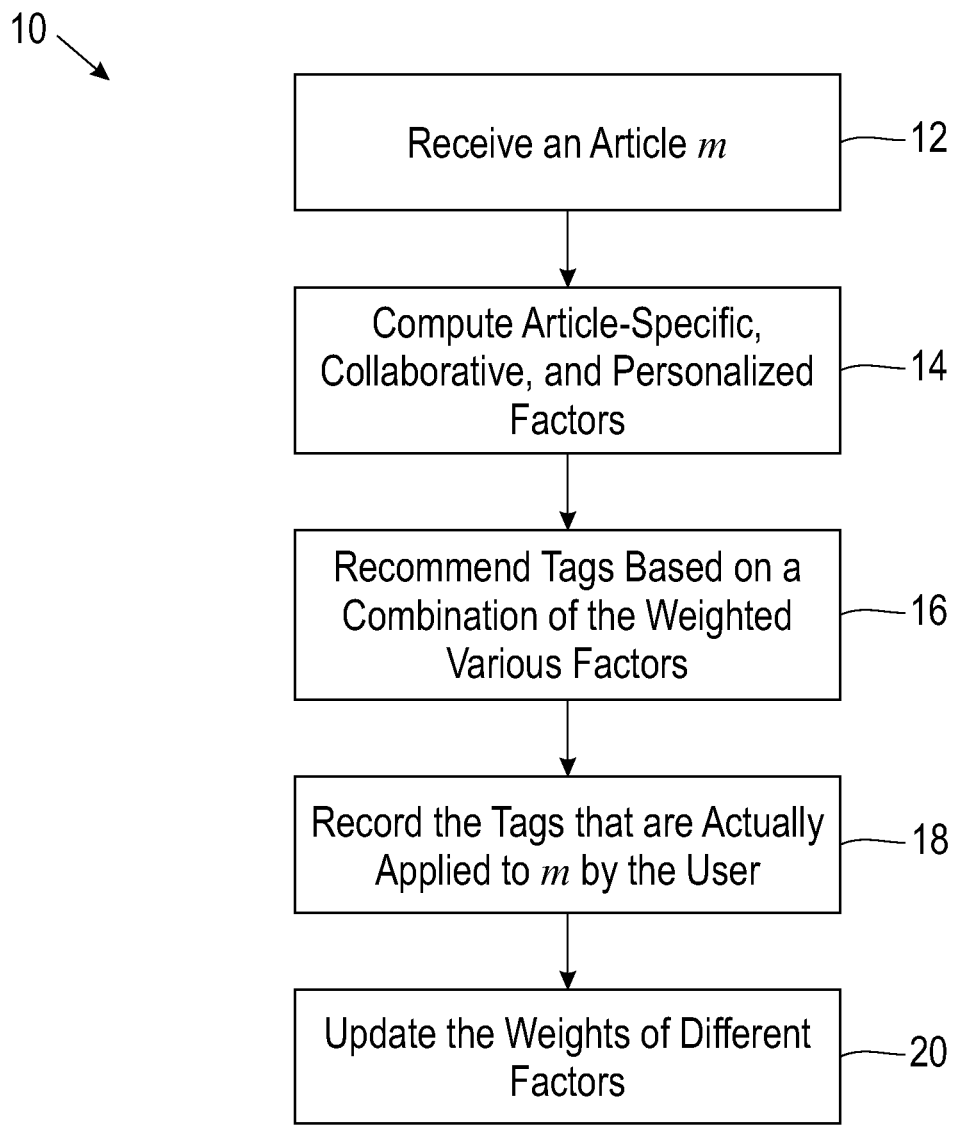
FIG. 1 shows a diagram of a flow-chart of a method for performing adaptive and personalized tag recommendation in accordance with an embodiment of the invention.

Embodiments of the invention provide personalized and adaptive tag recommendation in social bookmarking. In accordance with embodiments of the invention, hereinafter also referred to collectively, or individually as AP-TAG, we introduce an adaptive and personalized tag recommendation approach for enterprise social bookmarking systems. AP-TAG considers multiple factors when choosing terms to recommend as tags, such as how important a term is with regards to the corresponding article, whether the term has been used as tags by many users, and the past tagging activities of the current user. In contrast to existing tag recommendation approaches, AP-TAG utilizes information on social systems, such as people-tagging, to infer a user's interests and preferences.

A people-tagging system is similar to a normal social bookmarking system except that the resources being tagged are people instead of web pages. For example, a reference system may be designed to augment employee profiles with tagging in a company. In the reference system, people may be allowed to tag each other with terms they consider appropriate, and the tags one received from others are viewable on his/her employee profile. Tags applied to a user usually describe the user's attributes, such as her affiliations, expertise, and the projects she has been involved in. The initial goal of people-tagging is to help users to organize their connections and facilitate expertise search within the company. For instance, if employee A has been tagged with "java" by many colleagues, Employee A probably is an expert in Java. If employee B searches "java" in the reference system, all the users who have been tagged with "java" (including Employee A) will be returned and ranked by the number of times they have been tagged with "java". Embodiments of the invention utilize a user's tags in a people-tagging system to suggest tags for bookmarks in a social bookmarking system. Companies provide both a people-tagging system and a social bookmarking system, which makes our solution feasible. Furthermore, most existing employee profiling systems can be easily modified to support people-tagging, and thus our solution may be applied in most enterprise environments.

Finally, not every factor considered by AP-TAG is equally effective to every user at any time. For example, preference on tag selection which is learned from a user's past tagging activities may not be reliable at the very beginning, but may get more accurate later when more tagging activities of the user have been observed. For another example, if the tags a user received from her colleagues in the people-tagging system describe her very well, we may rely on those tags to infer the user's interests and then suggest appropriate tags for bookmarks; on the contrary, if the user has not received many tags in the people-tagging system or the tags are out-of-date, we should attach less importance on the information provided by the people-tagging system when suggesting tags to the user. AP-TAG employs an adaptive approach so as to maximize its performance for different users at different periods of time. For each individual user, AP-TAG keeps adjusting the weights of different factors based on their past performances so as to place more weights on those that are particularly effective to the user while reducing the weights of others.

The advantages of AP-TAG may be summarized as follows. The ideas of our solution can also be applied to other personalized recommendation tasks in enterprise, such as personalized search. AP-TAG considers multiple factors, including article-specific factors, collaborative factors, and personalized factors, when predicting the tags that are most likely to be chosen by a user on a given article. AP-TAG is adaptive so as to place emphases on factors that are most effective for a particular user during a particular period of time. As demonstrated by our experimental results, AP-TAG almost always outperforms its non-adaptive version that keeps weights of different factors unchanged.

In particular, AP-TAG may make use of people-tagging to infer interests and preferences of users. It has been shown that, in most cases, the aggregated set of tags one received from others in a people-tagging system adequately describe oneself and tags are updated more frequently than other sources of personal information, such as homepages. We can thus better predict the tags a user would like to use in her bookmarks by studying the tags she received in the people-tagging system. In a people-tagging system, a user may receive many tags from her colleagues even if the user herself is not very active. Hence, we may be able to make good predictions on tag recommendation even for users who are new to the social bookmarking system or do not have many bookmarking activities, as long as she has received appropriate tags from her colleagues in the people-tagging system. Our experimental results demonstrated that making use of users' tags in a people-tagging system can improve the performance of AP-TAG in most cases. Our results in turn support the statement in Farrell et al. that tags in a people-tagging system appropriately describe people's attributes and interests in an objective manner. It is noted that the authors in Farrell et al. drew the conclusion after conducting surveys and interviews with users, which is subjective. In contrast, the experiments on AP-TAG were performed on real-world data collected by a people-tagging system and a social-bookmarking system.

AP-TAG is very efficient. The computation, learning, and adaption steps in AP-TAG can all be performed very fast. We keep efficiency in mind during our design, as we believe that the tag-recommendation task should not consume much computation power.

AP-TAG makes a step forward towards the integration of the tagging of material resources and the tagging of people. We believe an integrated tagging system can make the search and management of online resources and human resources in an enterprise more effective and efficient.

Personalized Tag Recommendation

In this section, we first give the outline of AP-TAG and then describe every step in AP-TAG in detail. Assume that user employee A would like to tag an article m. AP-TAG suggests tags to employee A through the following steps.

1. Compute a factor vector for each of a number of factors. Each factor vector contains a number of keywords and the importance scores associated with those keywords.

2. Recommend tags on m to employee A based on a weighted combination of the factor vectors.

3. Record the tags that are actually applied by employee A on m

4. Adjust the weights of different factors for employee A based on their performance.

FIG. 1 is a flow-chart of a method 10 for use with a tag recommendation system in accordance with an embodiment of the invention. In step 12, an article m is received. In step 14, a number of factor vectors, including article-specific factors, collaborative factors, personalized factors, and tag co-occurrences, are computed. In step 16, a list of tags is recommended to employee A based on a weighted combination of the factor vectors. In step 18, the tags that are actually applied to m by employee A are recorded. In step 20, the weights of the various factors are adapted based on the tags actually applied by employee A.

In the rest of this section, we describe the above steps in detail.

Factor Vector Computation. The factors we test in the present embodiment of AP-TAG are listed as follows.

1. Article-specific factor: the keywords of the article m

2. Collaborative factor: the tags that other users have applied to m

3. Personalized factor: information about Employee A from various online social systems, including people-tagging system, blogging system, and so on 4. Tag co-occurrences: which tags are often applied together with certain article keywords Note that the above list of factors may be expanded to take into account other factors with similar or related information.

It is also possible to skip one or more of the above factors that are not available or cannot be efficiently computed in the target tagging system. In the following, we give examples on how to compute a vector from each of the above factors.

Article-Specific Factor.

There exists a lot of work on extracting keywords from text documents. In the current version of AP-TAG, we use a word's Term Frequency Inverse Document Frequency (TF-IDF) weight as its importance score with regards to an article. More specifically, the importance score S(t) of word t with regards to article m is computed as follows.

$$S(t)=\log(N(m,t))\times\log(|M|/|N(M,t)|)$$

where N(m, t) is the number of occurrences of t in m, |M| is the total number of articles, and |N(M, t)| is the number of articles that contain t.

Other keyword extraction approaches may be used as well.

The set of keywords together with their importance scores are stored in a factor vector dedicated to the article-specific factor.

Figure 2:
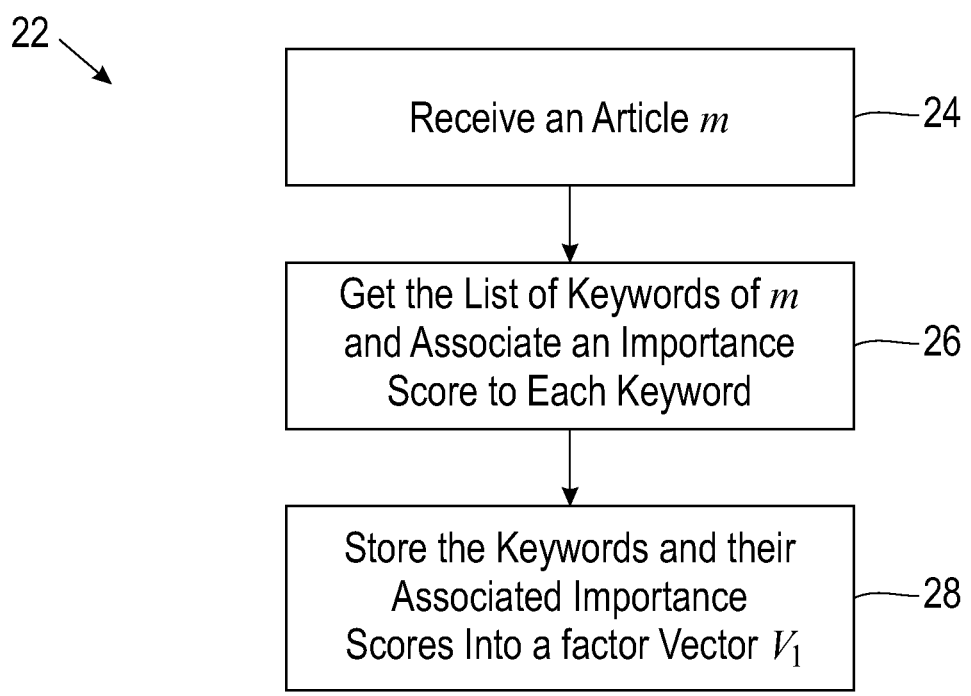
FIG. 2 shows a flow-chart of a method for computing the article-specific factor vector for use with the method in FIG. 1 in accordance with one embodiment of the present invention.

FIG. 2 is a flow-chart of a method 22 for computing the article-specific factor vector. In step 24, an article m is received. In step 26, a list of keywords is obtained and an importance score is associated with each keyword. In step 28, the keyword and associated importance scores are stored to a fact vector V.

Collaborative Factor.

Let $T_m$ be the set of tags other users have applied to the article m in the current tagging system. For each tag $t_i$ in $T_m$, the importance score of $t_i$ may be the number of users who have applied $t_i$ to m. Other methods to compute the importance scores may also be used.

The set of keywords together with their importance scores are stored in a factor vector dedicated to the collaborative factor.

Figure 3:
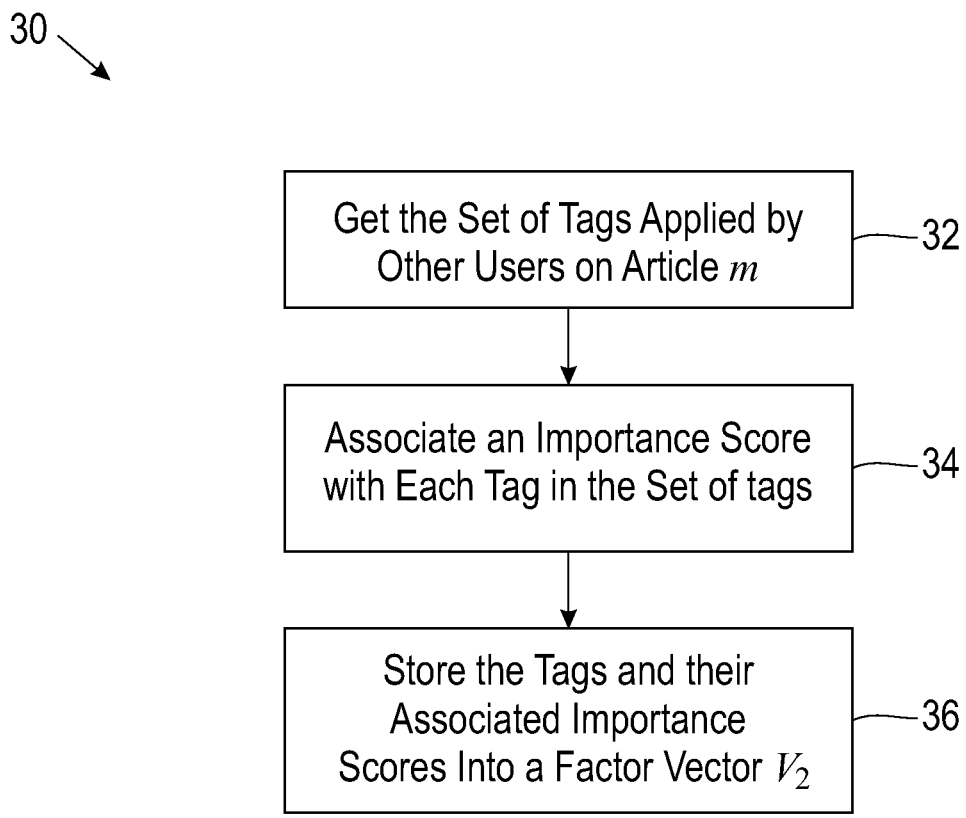
FIG. 3 shows a flow-chart of a method for computing the collaborative factor vector in accordance with one embodiment of the present invention.

FIG. 3 is a flow-chart of a method 30 for computing the collaborative factor vector. In step 32, the set of tags applied by other users on article m are obtained. In step 34, an importance score is associated with each tag in the set of tags. In step 36, the tags and their associated importance scores are stored into a factor vector $V_2$.

Personalized Factor.

AP-TAG retrieves information on Employee A from various online social systems. The social systems we test in the present embodiment of AP-TAG are listed as follows.

1. People tags, including the tags Employee A applied to other users and the tags others applied to Employee A.

2. Blogs, that is, the blog posts written by Employee A. Note that the above list of factors may be expanded to take into account other social systems, such as mini blogs. It is also possible to skip one or more of the above social systems that are not available to or cannot be efficiently accessed by the target tagging system.

We get a set of keywords for Employee A from each of the social systems we consider. For example, with people tagging, we use the set of tags Employee A applied to other users together with the set of tags others applied to Employee A as the set of keywords. An importance score is associated with each of the keywords. The importance score of a tag $t_i$ may be computed as the total number of times $t_i$ is used by Employee A on others and by others on Employee A. For another example, with blogs, we use the union of the top k keywords of each of Employee A's blog posts as the set of keywords. The importance score of a keyword $t_j$ in the set of keywords may be computed as the number of Employee A's blog posts that contain $t_j$.

Next, we combine the sets of keywords we extracted for Employee A from various social systems into a factor vector dedicated to the personalized factor. In the present embodiment of AP-TAG, we compute the union of the sets of keywords. The importance score of a keyword $t_i$ in the factor vector equals to the sum of its importance score in each individual set of keywords. It is also possible to assign different weights to the sets of keywords from different social systems when performing the combination.

Figure 4:
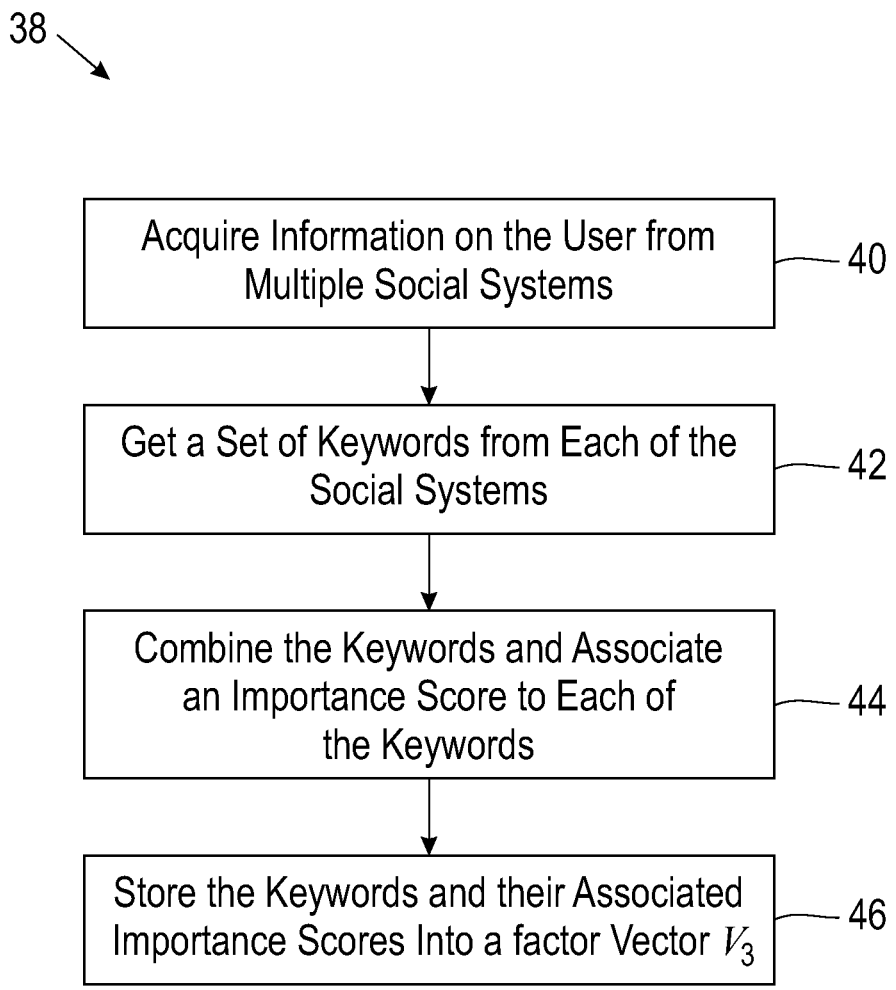
FIG. 4 shows a flow-chart of a method for computing the personalized factor vector in accordance with one embodiment of the present invention.

FIG. 4 is a flow-chart of a method 38 for computing the personalized factor vector. In step 40, information is acquired on the user from multiple social systems. In step 42, a set of keywords from each of the social systems is acquired. In step 44, the keywords are combined and an importance score is associated to each of the keywords. In step 46, the keywords and their associated importance scores are stored into a factor vector $V_3$.

Tag Co-Occurrences.

First of all, we record the co-occurrences of tags and article keywords in users' tagging activities. Assume that a user tagged an article $m_i$ with a set $T_i$ of tags. Let $W_i$ be the set of the most important keywords of $m_i$ (say, the 10 keywords with the highest importance scores). We then record that words in $W_i$ co-occur with tags in $T_i$ once.

Second, given an article m, let $W_m$ be the set of the most important keywords of m. For every tag $t_j$ that used to co-occur with at least one of the words in $W_m$ in users' past tagging activities, we compute the probability that $t_j$ should be applied to m as follows.

$$P(t_j, m) = 1 - \prod_{t_i \in W_m} (1 - N(t_j, t_i)/N(t_j))$$

where $N(t_j,t_i)$ is the number of times tag $t_j$ is applied to an article with keyword $t_i$ and $N(t_j)$ is the number of articles that have been applied the tag $t_j$. In other words, $N(t_j,t_i)/N(t_j)$ is the percentage of existing bookmarked articles with tag $t_j$ that also have keyword $t_i$. It is also possible to use other method to compute the co-occurring probability $P(t_j,m)$.

Finally, if $P(t_j,m)>h$, then $t_j$ is added to a factor vector dedicated to tag co-occurrences, where h is a real number threshold. The importance score of $t_j$ in the factor vector is set to be $P(t_j,m)$.

Figure 5:
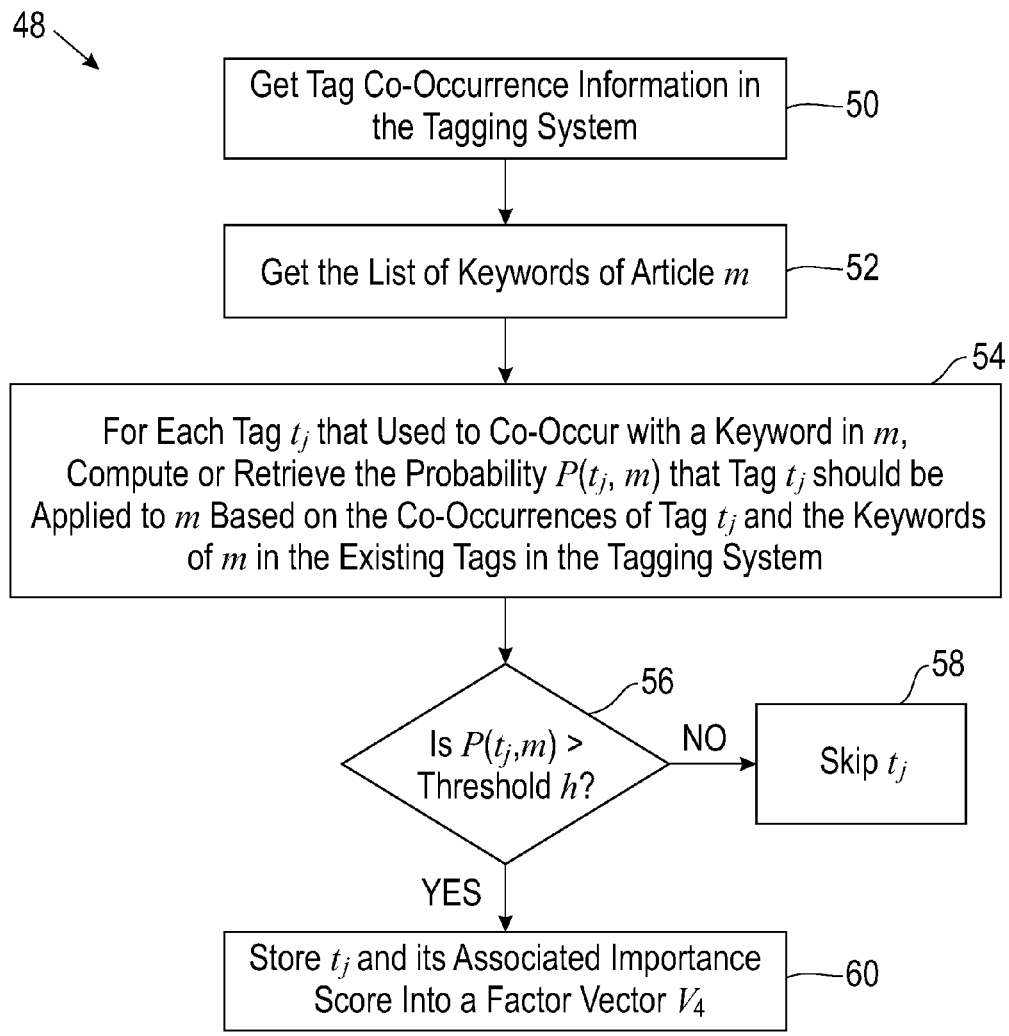
FIG. 5 shows a flow-chart of a method for computing the tag-co-occurrence factor vector.

FIG. 5 is a flow-chart of a method 48 for computing the tag-occurrence factor vector. In step 50, tag co-occurrence information in the tagging system is obtained. In step 52, the list of keywords of article m is obtained. In step 54, for each tag $t_j$ that used to co-occur with a keyword in m, the step computes or retrieves the probability $P(t_j,m)$ that tag $t_j$ should be applied to m based on the co-occurrences of tag $t_j$ and the keywords of m in the existing tags in the tagging system. In step 56, a determination is made of whether $P(t_j,m)>$threshold h. If not, then step 58, skips $t_j$. If so, step 60 stores $t_j$ and its associated importance score into a factor vector $V_4$.

Recommend Tags Based on Various Factors.

We have computed a number of factor vectors. Next, we recommend tags on the article m to Employee A.

First, we normalize the importance scores of the keywords in the factor vectors. In the present embodiment of AP-TAG, we normalize the importance scores in such as way that the average importance score of the keywords in every factor vector is equivalent. It is also possible to perform normalization in another way.

Second, we retrieve the current factor weights of the factor vectors. The factor weights may be initialized to 1 at the very beginning and will be adjusted with the use of the tag recommendation system.

Third, we combine the factor vectors into an overall recommendation vector based on the factor weights. The importance score $s(t_j)$ of a keyword $t_j$ in the recommendation vector is computed as $$s(t_j)=s_1(t_j)\cdot w_1+s_2(t_j)\cdot w_2+\ldots+s_c(t_j)\cdot w_c$$

where $s_j(t_i)$ is the importance score of $t_i$ in the jth factor vector, $w_j$ is the factor weight of the jth factor, and c is the number of factors we consider.

Finally, we sort the keywords in the recommendation vector in descending order of their importance scores and return the top k keywords as tags on the article m to Employee A.

Figure 6:
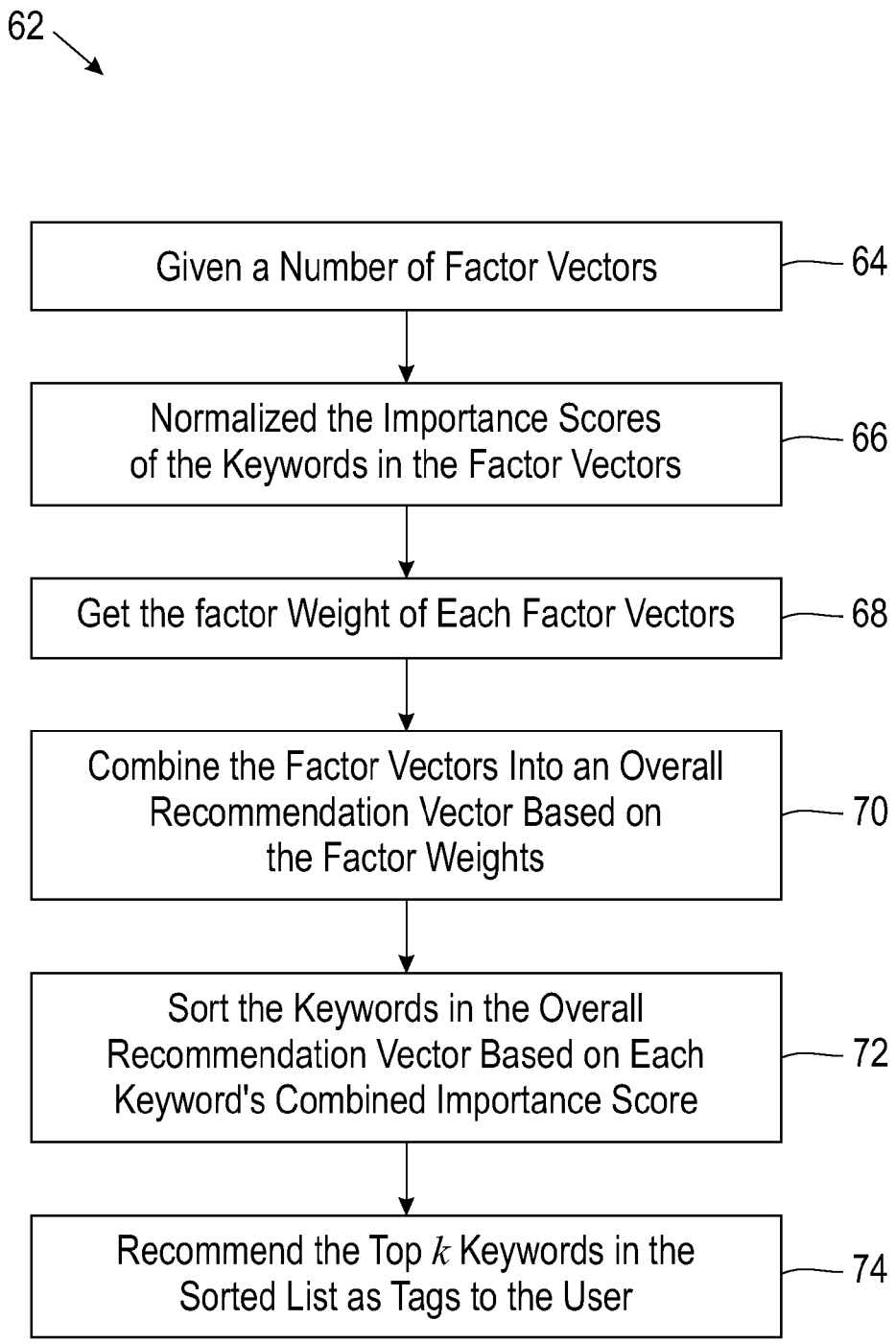
FIG. 6 shows a diagram of a flow-chart of a method for recommending tags based on a number of factor vectors.

FIG. 6 shows a diagram of a flow-chart of a method 62 for recommending tags based on a number of factor vectors. In step 64, a number of factor vectors are input. In step 66, the importance scores of the keywords in the factor vectors are normalized. In step 68, the factor weight of each factor vectors is obtained. In step 70, the factor vectors are combined into an overall recommendation vector based on the factor weights. In step 72, the keywords in the overall recommendation vector are sorted based on each keyword's combined importance score. In step 74, the top k keywords in the sorted list are recommended as tags to the user.

Factor Weight Adjustment.

The weights of the factors considered by AP-TAG depend on their past performance on predicting Employee A's tag selection.

For every tagging activity performed by Employee A, we compute the performance of each factor. Assume that Employee A tagged an article m with a set S of tags. Let $L_i$ be the list of the keywords in the ith factor vector sorted in descending order of importance scores. We then compute a matching score between $L_i$ and S. In a preferred embodiment, we use the Normalized Discounted Cumulative Gain (NDCG) as the matching score between list L and set S. It is possible to use other methods to compute matching score too.

$$NDCG(L,S)=Z_x\Sigma_{i=1}^x(2^{r_i}-1)/\log_2(i+1)$$

where $r_i$ is 1 if the ith element of L is in S and $r_i$ is 0 otherwise. $Z_x$ is chosen so that a perfect ranking has NDCG value of 1.

Second, we compute the average value x of the matching scores of all the factor vectors. For every list $L_i$, if $NDCG(L_i, S)>x$, we increase $w_i$, which is the weight of the ith factor; otherwise, if $NDCG(L_i, S)<x$, we decrease $w_i$. In a preferred embodiment, we increase or decrease $w_j$ by multiplying its current value with $(1+\alpha)$ or $(1-\alpha)$ at a time, where $\alpha$ is a real number in $(0, 1)$ that determines the speed of adjustment it is possible to use other methods to update the corresponding factor weights. It is also possible to adjust the factor weights periodically or in a batch mode rather than doing so after each recommendation.

Figure 7:
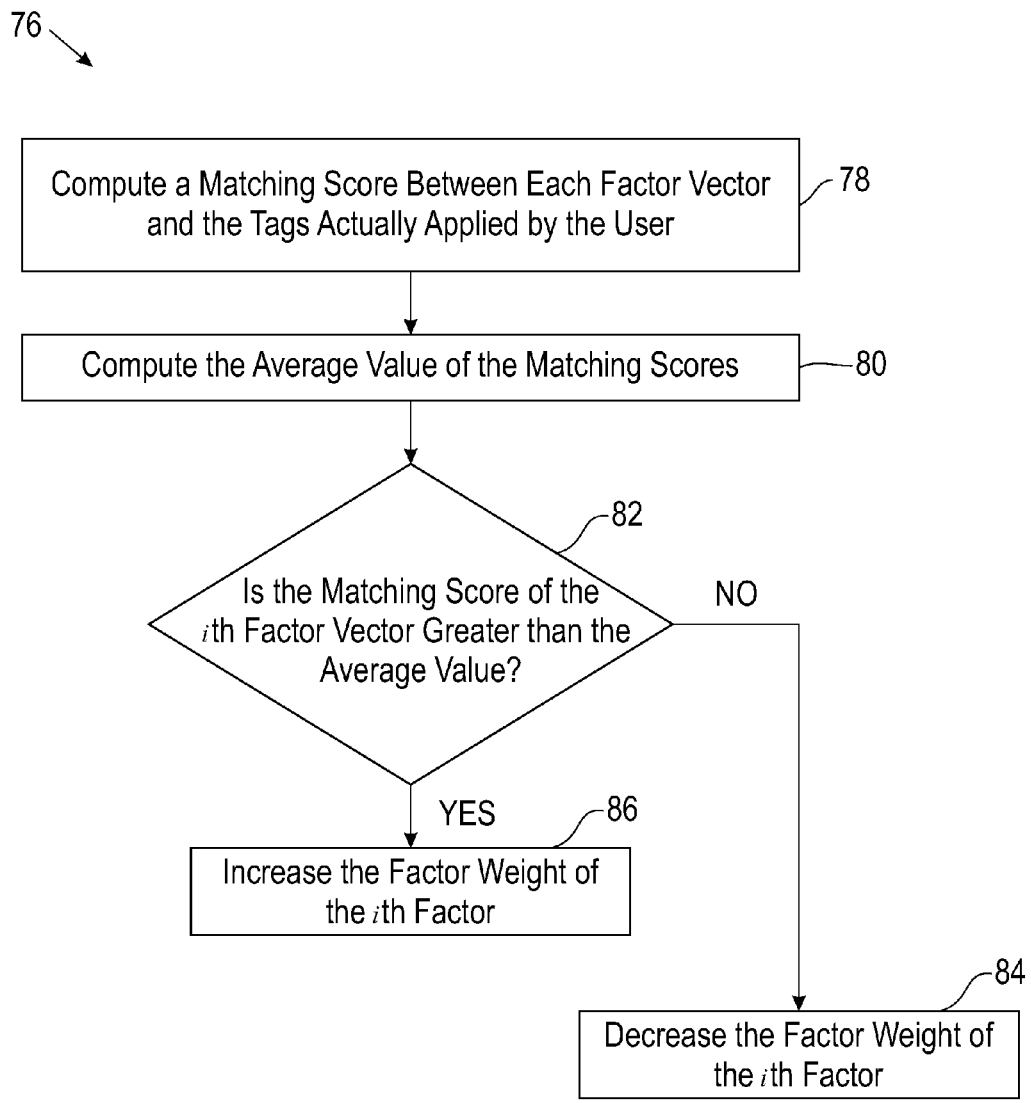
FIG. 7 shows a diagram of a flow-chart of a method for adjusting factor weights in accordance with one embodiment of the present invention.

FIG. 7 shows a diagram of a flow-chart of a method 76 for adjusting factor weights in accordance with one embodiment of the present invention. In step 78, a matching score between each factor vector and the tags actually applied by the user is computed. In step 80, the average value of the matching scores is computed. In step 82, a determination is made of whether the matching score of the ith factor vector greater than the average value. If not, step 84 decreases the factor weight of the ith factor. If so, step 86 increase the factor weight of the ith factor.

Experimental Results

We have implemented a proof-of-concept prototype of AP-TAG. Experiments have been performed on real-world data collected a social bookmarking system and a people-tagging system running at a company. Contributors of the data were the company's employees. The main objectives of our experiments are listed as follows.

1. We would like to test the effectiveness of AP-TAG. We would like to see how well AP-TAG is in predicting the tags a user would like to apply on an article.

2. We would like to check whether people-tagging has positive contributions to the performance of AP-TAG. In particular, we would like to see if information from people-tagging can help alleviate the cold-start problem of learning-based recommendation approaches.

3. We would like to check whether being adaptive helps AP-TAG to achieve better performance.

There are two ways to evaluate the performance of a tag recommendation approach. The first one is to ask human users to determine the quality of the suggested tags. While this is a natural evaluation method, conducting interviews or surveys with human users are expensive and time-consuming. It is usually difficult to collect results from many people on a large number of webpages. The second method makes use of data only. It compares the recommended tags with the tags actually selected by human users to see how well a tag recommendation approach is in predicting the tags users would like to apply. Since this method does not require users to involve directly, it is easy to carry out and can test a large amount of cases. We adopt the second method to evaluate AP-TAG. Since we have not deployed AP-TAG yet, our experiments were performed on existing data collected by a social networking system at a company, and the bookmarks were made by users without the help of any tag recommendation algorithms. In other words, the webpages used in our tests were tagged by users before the existence of our tag recommendation approach. For each bookmarked webpage m, we compare the set $T_r$ of tags recommended by AP-TAG with the set $T_a$ of tags actually applied by the corresponding user. The recall of a tag recommendation approach on m is computed as follows:

$$R(m)=|T_r\cap T_a|/|T_a|$$

In other words, recall is the percentage of tags applied by the user that are recommended by the tag recommendation approach. It is clear that the more tags an approach recommends, the higher recall the approach may have. However, in practice, the number of tags that may be recommended by a social bookmarking system is limited, or the user may be confused by a large number of suggested tags. In our experiments, we test cases where a tag recommendation approach is allowed to suggest 2, 4, 6, 8, and 10 tags for each webpage respectively.

Our experiments were performed on users who have received 40 tags in a people tagging system and have bookmarked at least 70 webpages in a social bookmarking system. There are 40 such users in the company and these users have bookmarked more than 10,000 webpages in total. The experimental results reported in the rest of this section are average recalls over these 40 users.

To begin with, we would like to test the effectiveness of AP-TAG. Compare the recall of AP-TAG with those of a straightforward approach the recommends the most important keywords of an article as tags. The straightforward approach and AP-TAG employ the same keyword extraction algorithm. Experimental results are given in FIGS. 6a and 6b which show the recalls of tag recommendation approaches.

Values in the first column of a table represent the number of tags that are returned by the rag-recommendation approaches. The column name "Keyword" refers to a straightforward approach that simply recommends keywords as tags; "w/o People-tagging" refers to a modified version of AP-TAG without using people-tagging information; "Non-adaptive" refers to a non-adaptive version of AP-TAG.

We have performed two sets of experiments. In the first set, we tested the first 30 webpages bookmarked by the users; in the second set, we tested all the webpages bookmarked by the users. The tested webpages were given to AP-TAG one by one. Since AP-TAG learns from a user's tagging activities, it is expected to improve its performance after processing many webpages for a user. According to the data in FIGS. 6(a) and 6(b), AP-TAG outperformed the straightforward approach (referred to as Keyword in the tables) in both sets of experiments. More specifically, from FIG. 6(a), the recalls of AP-TAG were 0.04 to 0.05 higher than Keyword (a relative improvement of about 20% to 40%), when 30 webpages were tested per user. From FIG. 6(b), the recalls of AP-TAG were 0.08 to 0.13 higher than Keyword (a relative improvement of about 50% to 80%), when all bookmarked webpages were tested. We may thus conclude that AP-TAG is significantly better than the straightforward approach in predicting the tags users would like to apply. Furthermore, the recalls of AP-TAG in FIG. 6(b) are 0.05 to 0.09 higher than those in FIG. 6(a) (a relative improvement of about 25% to 30%). This demonstrates that AP-TAG can effectively boost its performance by learning from users' tagging activities.

Second, we would like to check whether people-tagging has positive contributions to the performance of AP-TAG. To do so, we compare AP-TAG with its modified version which is the same as AP-TAG except that it does not make use of people-tagging information (or equivalently, it assumes that everyone has an empty set of tags in the people-tagging system). Experimental results are given in FIGS. 6(a) and 6(b). According to the data in FIGS. 6(a) and 6(b), AP-TAG outperformed its modified version (referred to as "w/o People-tagging" in the tables). More specifically, from FIG. 6(a), the recalls of AP-TAG were 0.010 to 0.018 higher than its modified version (a relative improvement of about 6% to 8%), when 30 webpages were tested per user; from FIG. 6(b), the recalls of AP-TAG were 0.004 to 0.007 higher than its modified version (a relative improvement of about 1% to 2%), when all bookmarked webpages were tested. In other words, the performance enhancement due to people-tagging is more obvious before AP-TAG gets to learn users' tagging preferences. This demonstrates that people-tagging is a good source of information for inferring users' interests and preferences, and it can help address the cold-start problem of learning-based recommendation systems in cases where the users have received tags before using the recommendation systems.

Third, we would like to check whether the adaptive approach employed by AP-TAG is effective. To do so, we compare AP-TAG with its modified version which is the same as AP-TAG except that it does not recompute the weights of conditions nor adjust the threshold of the learning-based component. Experimental results are given in FIGS. 8(a) and 8(b). According to the data in FIGS. 8(a) and 8(b), AP-TAG outperformed its modified version (referred to as "Non-adaptive" in the tables) in almost all cases. More specifically, from FIG. 8(a), the recalls of AP-TAG were 0.005 to 0.009 higher than its modified version (a relative improvement of about 1%), when 30 webpages were tested per user; from FIG. 8(b), the recalls of AP-TAG were 0.035 to 0.052 higher than its modified version (a relative improvement of about 15%) for cases where at least 4 tags are suggested, when all bookmarked webpages were tested. When more webpages are tested per user, AP-TAG will have more opportunities to adjust the weights of different factors to better fit the preferences of each user. Therefore, the adaptive approach leads to much larger performance enhancement in the second set of experiments (data in FIG. 8(a)).

The recalls reported in FIGS. 8(a) and 8(b) were computed by performing exact string matching between the tags suggested by AP-TAG and the tags applied by users. Sometimes, the tags recommended by AP-TAG and those applied by users are synonyms or the same word in different form. For example, "apple" and "apple inc" refer to the same company, but they are considered to be different in our earlier experiments. We have performed another set of experiments that take approximate matching into account. Given a webpage, if AP-TAG recommends a tag that is similar to a tag applied by the corresponding user, it is given a 50% credit. In other words, the recall of AP-TAG on webpage m is computed as $$R'(m)(|T_r \cap T_a| + |T'_{app}| \times 0.5)/|T_a|$$

where $T'_{app}$ is the set of tags in $T_a$ that are synonyms or syntactically related (but not equivalent) to a tag in $T_r$. The experimental results are given in FIG. 9, which shows the recalls of AP-TAG with approximate matching. Values in the first column represent the number of webpages that are tested for each user. The column name "Rec. k" represents the case where k tags are returned by AP-TAG. Not surprisingly, the recalls of AP-TAG were much higher when approximate matching is used than when exact matching is employed. According to FIG. 9, AP-TAG had recalls of 0.3 to 0.4 when 4 to 8 tags are recommended, which makes it a very effective tag recommendation approach in practice.

Finally, AP-TAG is not only effective, but also efficient. With a workstation with a 2.5 GHz Intel Duo Core 2 CPU and 3 GB main memory, AP-TAG was able to make tag recommendation for more than 40,000 webpages in 400 seconds (or around 10 milliseconds per webpage). Such performance is very acceptable in practice.

In accordance with the embodiments of the invention, we have disclosed a personalized tag recommendation approach called AP-TAG for enterprise social bookmark systems. AP-TAG considers multiple factors, such as the popularity of tags and users' past tagging activities, when choosing the set of tags to be suggested. In particular, AP-TAG utilizes information from people-tagging to infer a user's interests and preferences. Information from people-tagging can help alleviate the cold-start problem of learning-based approaches. Furthermore, AP-TAG is adaptive and it adjusts the weights of different factors based on their past performances, so as to place more weights on those that are particularly effective to a user while reducing the weights of the others. We have implemented a prototype of AP-TAG and performed experiments on real-world data collected by the company's social bookmarking system and its people-tagging system. Our experimental results show that people-tagging can effectively enhance tag recommendation for webpages in social bookmarking systems, and the adaptive approach in AP-TAG can further improvement the performance of tag recommendation.

As can be seen from the above disclosure, embodiments of the invention provide techniques for personalized and adaptive tag recommendation. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
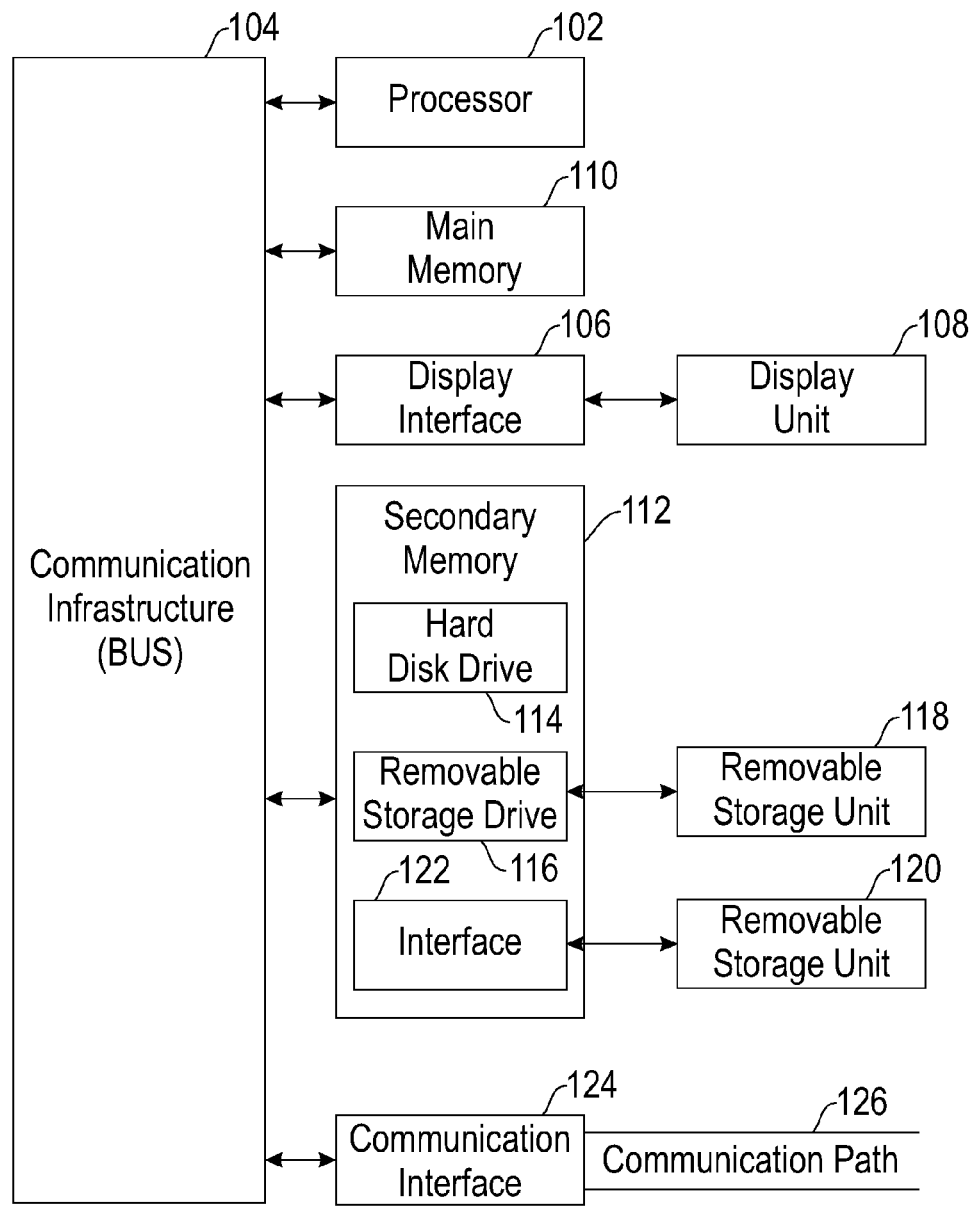
FIG. 10 shows a high level block diagram of an information processing system useful for implementing one embodiment of the present invention.

FIG. 10 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    computing, by a processor, a plurality of sets of candidate tags for a document, wherein the plurality of sets of candidate tags include a set of candidate tags based on document-specific factors including keywords in the document, a set of candidate tags based on collaborative factors including tags that other users have applied to the document, a set of candidate tags based on personalized factors including information about a user and a set of candidate tags based on tag co-occurrences factors including tags that are often applied together with certain keywords;
    combining the plurality of sets of candidate tags from different factors into an overall recommendation list of candidate tags;
    returning at least one suggested tag from the overall recommendation list of candidate tags;
    recording at least one applied tag that is applied to the document by a user of a computer system; and
    adjusting the overall recommendation list of candidate tags based on the at least one applied tag.

2. The method of claim 1, wherein computing at least one set of candidate tags further comprises:
    extracting at least one keyword from the document; and
    associating an importance score with each keyword, wherein each keyword is a candidate tag.

3. The method of claim 1, wherein computing candidate tags further comprises:
    retrieving additional tags that other users have applied to the document; and
    associating an importance score with each additional tag.

4. The method of claim 3, wherein computing candidate tags further comprises:
    retrieving information about the user to whom the additional tags are recommended, from at least one online social system;
    extracting a set of keywords from the retrieved information; and
    associating an importance score with each keyword, wherein each keyword is a candidate tag.

5. The method of claim 4, wherein the online social system is selected from the group consisting of:
    blogging;
    people tagging;
    social bookmarking; and
    mini blogging.

6. The method of claim 1, wherein computing candidate tags further comprises:
   computing a co-occurrence information among existing tags applied by users and keywords of existing bookmarked documents; and
   associating an importance score with each tag that co-occurred with a keyword in the document to be recommended tags on, in accordance with the co-occurrence information.

7. The method of claim 1, wherein the combining of at least one set of candidate tags further comprises:
   assigning a factor weight to each set of the candidate tags from a particular factor;
   combining the sets of candidate tags in accordance to their factor weights; and
   assigning an importance score to each candidate tag in the overall recommendation list of candidate tags.

8. The method of claim 7, wherein adjusting the overall recommendation list of candidate tags further comprises:
   comparing the set of candidate tags from every factor with the set of tags applied by the user; and
   adjusting the factor weight of every factor based on the comparison.

9. The method of claim 1, wherein returning at least one suggested tag further comprises sorting the candidate tags in the overall recommendation list based on the importance scores of the candidate tags.

10. A method, comprising:
    computing, by a processor, a plurality of sets of candidate tags for a document in accordance with different factors by extracting at least one keyword from the document, and associating an importance score with each keyword, wherein each keyword is a candidate tag, wherein the plurality of sets of candidate tags include a set of candidate tags based on document-specific factors including keywords in the document, a set of candidate tags based on collaborative factors including tags that other users have applied to the document, a set of candidate tags based on personalized factors including information about a user and a set of candidate tags based on tag co-occurrences factors including tads that are often applied together with certain keywords;
    combining the plurality of sets of candidate tags from different factors into an overall recommendation list of candidate tags;
    returning at least one suggested tag from the overall recommendation list of candidate tags;
    recording at least one applied tag that is applied to the document by a user of a computer system; and
    adjusting the overall recommendation list of candidate tagsbased on the at least one applied tag.

11. The method of claim 10, wherein computing candidate tags further comprises:
    retrieving additional tags that other users have applied to the document; and
    associating an importance score with each additional tag.

12. The method of claim 11, wherein computing candidate tags further comprises:
    retrieving information about the user to whom the additional tags are recommended, from at least one online social system;
    extracting a set of keywords from the retrieved information; and
    associating an importance score with each keyword, wherein each keyword is a candidate tag.

13. The method of claim 10, wherein the online social system is selected from the group consisting of:
    blogging;
    people tagging;
    social bookmarking; and
    mini blogging.

14. The method of claim 10, wherein computing candidate tags further comprises:
    computing a co-occurrence information among existing tags applied by users and keywords of existing bookmarked documents; and
    associating an importance score with each tag that co-occurred with a keyword in the document to be recommended tags on in accordance with the co-occurrence information.

15. The method of claim 10, wherein the combining at least one set of candidate tags further comprises:
    assigning a factor weight to each set of the candidate tags from a particular factor;
    combining the sets of candidate tags in accordance to their factor weights; and
    assigning an importance score to each candidate tag in the overall recommendation list of candidate tags.

16. The method of claim 15, wherein adjusting the overall recommendation list of candidate tags further comprises:
    comparing the set of candidate tags from every factor with the set of tags applied by the user; and
    adjusting the factor weight of every factor based on the comparison.

17. The method of claim 10, wherein returning at least one suggested tag further comprises sorting the candidate tags in the overall recommendation list based on the importance scores of the candidate tags.

18. A computer program product comprising a non-transitory computer readable storage medium having computer readable program code embodied therewith, said computer readable program code comprising computer readable program code configured to:
    compute a plurality of sets of candidate tags for a wherein each of the plurality of sets of candidate tags is based on different factors, wherein the plurality of sets of candidate tags include a set of candidate tags based on document-s ecific factors including keywords in the document, a set of candidate tags based on collaborative factors including tags that other users have applied to the document, a set of candidate tags based on personalized factors including information about a user and a set of candidate to s based on tag co-occurrences factors including tags that are often applied together with certain keywords;
    combine the plurality of sets of candidate tags from different factors into an overall recommendation list of candidate tags;
    return at least one suggested tag from the overall recommendation list of candidate tags;
    record at least one applied tag that is applied to the document by a user of a computer system; and
    adjust the overall recommendation list of candidate tags based on the at least one applied tag.

19. The computer program product of claim 18, wherein said computer program product is further configured to:
    extract at least one keyword from the document; and
    associate an importance score with each keyword, wherein each keyword is a candidate tag.

20. The computer program product of claim 18, wherein the computing of candidate tags further comprises:
    retrieving additional tags that other users have applied to the document; and
    associating an importance score with each additional tag.

21. The computer program product method of claim 20, wherein the computing of candidate tags further comprises:
  retrieving information about the user to whom the additional tags are recommended, from at least one online social system;
  extracting a set of keywords from the retrieved information; and
  associating an importance score with each keyword, wherein each keyword is a candidate tag.

22. The computer program product of claim 18, wherein the online social system is selected from the group consisting of:
  blogging;
  people tagging;
  social bookmarking; and
  mini blogging.

23. The computer program product of claim 18, wherein computing candidate tags further comprises:
  computing co-occurrence information among existing tags applied by users and keywords of existing bookmarked documents; and
  associating an importance score with each tag that co-occurred with a keyword in the document to be recommended tags on in accordance with the co-occurrence information.

\* \* \* \* \*